(12) United States Patent
Wakimoto

(10) Patent No.: US 12,024,345 B2
(45) Date of Patent: Jul. 2, 2024

(54) PACKAGING BOX

(71) Applicant: KYOCERA Document Solutions Inc., Osaka (JP)

(72) Inventor: Atsuhiro Wakimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 254 days.

(21) Appl. No.: 17/701,447

(22) Filed: Mar. 22, 2022

(65) Prior Publication Data
US 2022/0315277 A1 Oct. 6, 2022

(30) Foreign Application Priority Data
Mar. 31, 2021 (JP) ................. 2021-059691

(51) Int. Cl.
*B65D 5/70* (2006.01)
*B65D 5/02* (2006.01)

(52) U.S. Cl.
CPC ........... *B65D 5/701* (2013.01); *B65D 5/0227* (2013.01); *B65D 5/0254* (2013.01)

(58) Field of Classification Search
CPC .... B65D 5/701; B65D 5/0227; B65D 5/0254; B65D 5/106; B65D 5/062; B65D 5/06; B65D 5/541; B65D 2585/689; B65D 5/5007; B65D 5/4266; B65D 5/10; B65D 2401/00; B65D 2401/15; B65D 5/5415; B65D 77/2028; Y02W 30/80; G03G 15/0874; G03G 2215/068; B41J 2/17503; B41J 2/17553; B41J 2/17533; Y10S 206/807

USPC ....... 229/244, 102, 153, 232, 148, 141, 150, 229/156, 177, 188, 237, 242; 206/807
See application file for complete search history.

(56) References Cited

U.S. PATENT DOCUMENTS

| | | | | |
|---|---|---|---|---|
| 3,168,975 | A * | 2/1965 | Buttery | B65D 5/5415 229/145 |
| 3,462,066 | A * | 8/1969 | Farquhar | B65D 5/106 229/102 |
| 5,577,612 | A * | 11/1996 | Chesson | B65D 83/0894 229/232 |
| 7,267,261 | B2 * | 9/2007 | Lo Duca | B65D 5/541 229/148 |
| 8,408,451 | B2 * | 4/2013 | Adam | B65D 5/6608 229/222 |

(Continued)

FOREIGN PATENT DOCUMENTS

JP 2018-154361 A 10/2018

*Primary Examiner* — Christopher R Demeree
(74) *Attorney, Agent, or Firm* — Stein IP, LLC

(57) ABSTRACT

A packaging box is fabricated by bending a corrugated cardboard plate and includes a quadrangular tube-shaped body that is rectangular in cross section and a cover for closing an opening of the body. The first cover plate is connected to a first end edge of one of the pair of first circumferential surface plates on a side near the opening and closes the opening. The second cover plate is connected to a second end edge of the other of the pair of first circumferential surface plates on the side near the opening and is adhered to an outer surface of the first cover plate. The second cover plate is split into an adhesive piece that is adhered to the first cover plate and a peeling piece that has one side connected to the second end edge and is peeled off from the adhesive piece along a breaking line.

5 Claims, 7 Drawing Sheets

(56) References Cited

U.S. PATENT DOCUMENTS 9,573,719 B2 * 2/2017 Deering ................ B65D 5/106
2018/0265245 A1 9/2018 Sumitomo

* cited by examiner

PACKAGING BOX

INCORPORATION BY REFERENCE

This application is based upon and claims the benefit of priority from the corresponding Japanese Patent Application No. 2021-059691 (filed on Mar. 31, 2021), the entire contents of which are incorporated herein by reference.

BACKGROUND

The present disclosure relates to a packaging box.

A conventional packaging box includes a cover for closing an opening of a body thereof. The cover includes a first cover plate for covering the opening and a second cover plate intended to be adhered to an upper surface of the first cover plate via an adhesion region. The second cover plate includes a zonal portion enclosed by breaking lines.

The zonal portion is peeled off along the breaking lines extending parallel to each other, and thus the second cover plate is divided to open the opening of the body.

In a case of adopting the conventional technique, the zonal portion is split from the packaging box at the time of unsealing, which has led to a problem of an increase in number of trash pieces. This has also led to another problem of poor convenience due to the zonal portion being broken partway during unsealing.

SUMMARY

A packaging box according to one aspect of the present disclosure is fabricated by bending a corrugated cardboard plate and includes a body having a rectangular tube shape and a cover for closing an opening of the body on one side thereof. The body is composed of a pair of first circumferential surface plates opposed to each other and a pair of second circumferential surface plates opposed to each other orthogonally to the pair of first circumferential surface plates. The cover includes a first cover plate and a second cover plate. The first cover plate is connected to a first end edge of one of the pair of first circumferential surface plates on a side near the opening and closes the opening. The second cover plate is connected to a second end edge on the opening side of the other of the pair of first circumferential surface plates and is adhered to an outer surface of the first cover plate. The second cover plate is split into an adhesive piece that is adhered to the first cover plate and a peeling piece that has one side connected to the second end edge and is peeled off from the adhesive piece along a breaking line.

Still other objects of the present disclosure and specific advantages provided by the present disclosure will be made further apparent from the following descriptions of embodiments.

DETAILED DESCRIPTION

First Embodiment

Figure 1:
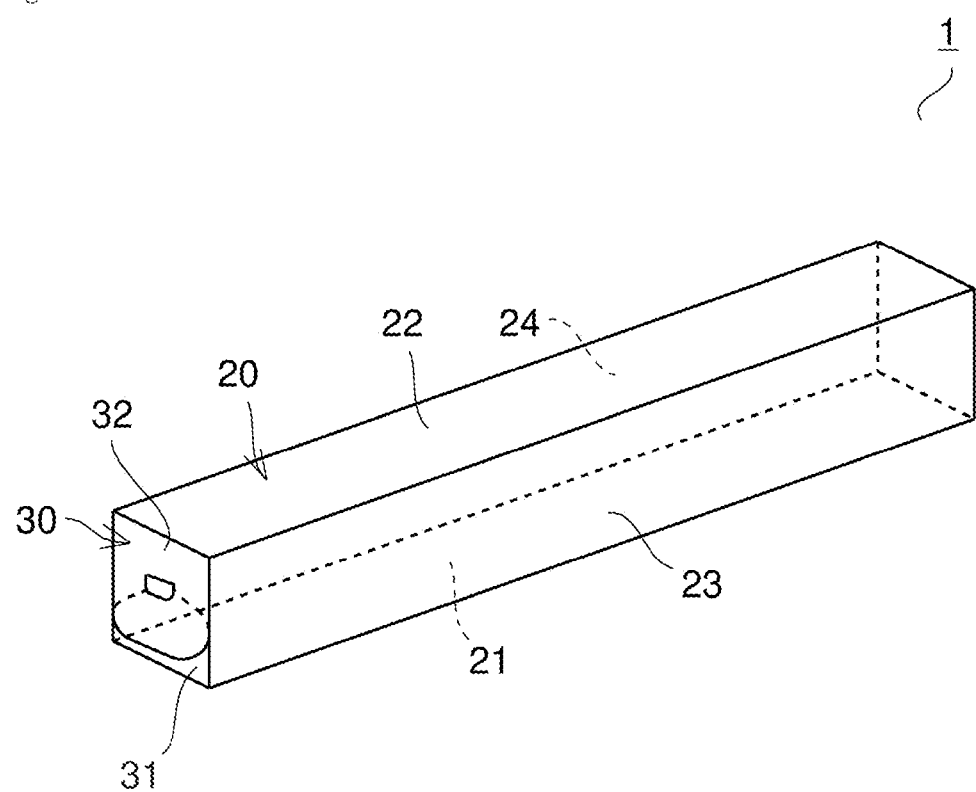
FIG. 1 is a perspective view of a packaging box according to a first embodiment of the present disclosure.
Figure 2:
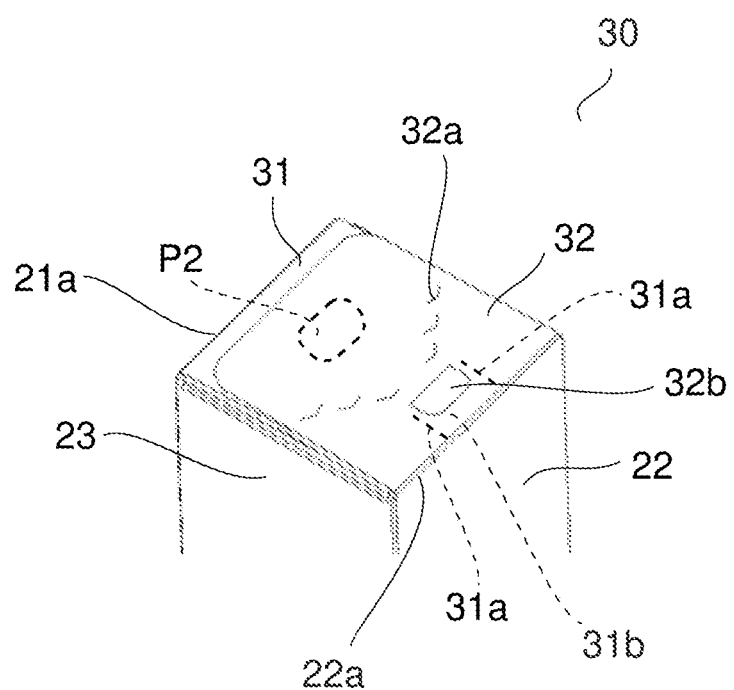
FIG. 2 is a perspective view showing, on an enlarged scale, one end part of the packaging box according to the first embodiment of the present disclosure in a longitudinal direction thereof.

With reference to the appended drawings, the following describes an embodiment of the present disclosure. FIG. 1 is a perspective view of a packaging box 1 according to a first embodiment, and FIG. 2 is a perspective view showing, on an enlarged scale, one end part of the packaging box 1 in a longitudinal direction thereof in a state before unsealing.

The packaging box 1 is a discrete packaging box for individually packaging an article to be packaged (in this embodiment, a toner cartridge, for example). The packaging box 1 is a rectangular parallelepiped-shaped box body with one end part in a longitudinal direction thereof being unsealable. The packaging box 1 is fabricated by bending a corrugated cardboard plate punched into a prescribed shape. In a collective box (not shown) larger than the packaging box 1, a plurality of packaging boxes 1 are contained in contact with each other without any gap therebetween.

The packaging box 1 includes a body 20 and a cover 30. The body 20 is composed of a pair of first circumferential surface plates 21 and 22 opposed to each other and a pair of second circumferential surface plates 23 and 24 opposed to each other orthogonally to the pair of first circumferential surface plates 21 and 22. In this embodiment, the body 20 is composed of the pair of first circumferential surface plates 21 and 22 opposed to each other in an up-down direction and the pair of second circumferential surface plates 23 and 24 opposed to each other in a front-rear direction. The second circumferential surface plate 23 connects together respective front ends of the pair of first circumferential surface plates 21 and 22, The second circumferential surface plate 24 connects together respective rear ends of the pair of first circumferential surface plates 21 and 22.

The cover 30 closes at least an opening of the body 20 on one side thereof and becomes freely operable after the packaging box 1 has been unsealed. The cover 30 is composed of a first cover plate 31, a second cover plate 32, and a pair of flap plates 33 and 34 (see FIG. 3). The first cover plate 31 is connected to a first end edge 21a of the first circumferential surface plate 21 on a side near the opening. The second cover plate 32 is connected to a second end edge 22a of the first circumferential surface plate 22 on a side near the opening. The second cover plate 32 is adhered to an upper surface (outer surface) of the first cover plate 31 via an adhesion region P2. That is, the second cover plate 32 includes the adhesion region P2 to be adhered to the upper surface (outer surface) of the first cover plate 31.

The flap plate 33 is connected to an end edge of the second circumferential surface plate 23 on a side near the opening and closes the opening on inner sides of the first cover plate 31 and the second cover plate 32. The flap plate 34 is connected to an end edge of the second circumferential surface plate 24 on a side near the opening.

The second cover plate 32 has a breaking line 32a and a through hole 32b. The breaking line 32a traverses between the adhesion region P2 and the second end edge 22a. The second cover plate 32 is to be divided along the breaking line 32a. The breaking line 32a is formed in a V shape convex toward the second end edge 22a. The through hole 32b is disposed adjacently to a center of the breaking line 32a in an extending direction thereof. In this embodiment, the through hole 32b is disposed adjacently to a vertex of the breaking line 32a, and a finger is insertable thereinto.

The first cover plate 31 has a pair of incision lines 31a. The pair of incision lines 31a is formed in a shape of a straight line and is disposed around a region opposed to the through hole 32b. One end of each of the incision lines 31a is disposed at a distal end of the first cover plate 31. Thus, when the region opposed to the through hole 32b is pushed down, the first cover plate 31 is split along the incision lines 31a to form a push-in piece 31b.

The flap plate 33 has a slit-shaped insertion hole 33a provided therein. The flap plate 34 includes a trapezoidal insertion piece 34a provided therein so as to be insertable into the insertion hole 33a. The insertion piece 34a is inserted into the insertion hole 33a, and thus the flap plate 33 can be engaged with the flap plate 34. That is, the flap plate 33, which is one of the pair of flap plates 33 and 34, has the insertion hole 33a formed therein, and the flap plate 34, which is the other of the pair of flap plates 33 and 34, has the insertion piece 34a formed therein so as to be insertable into the insertion hole 33a.

Figure 3:
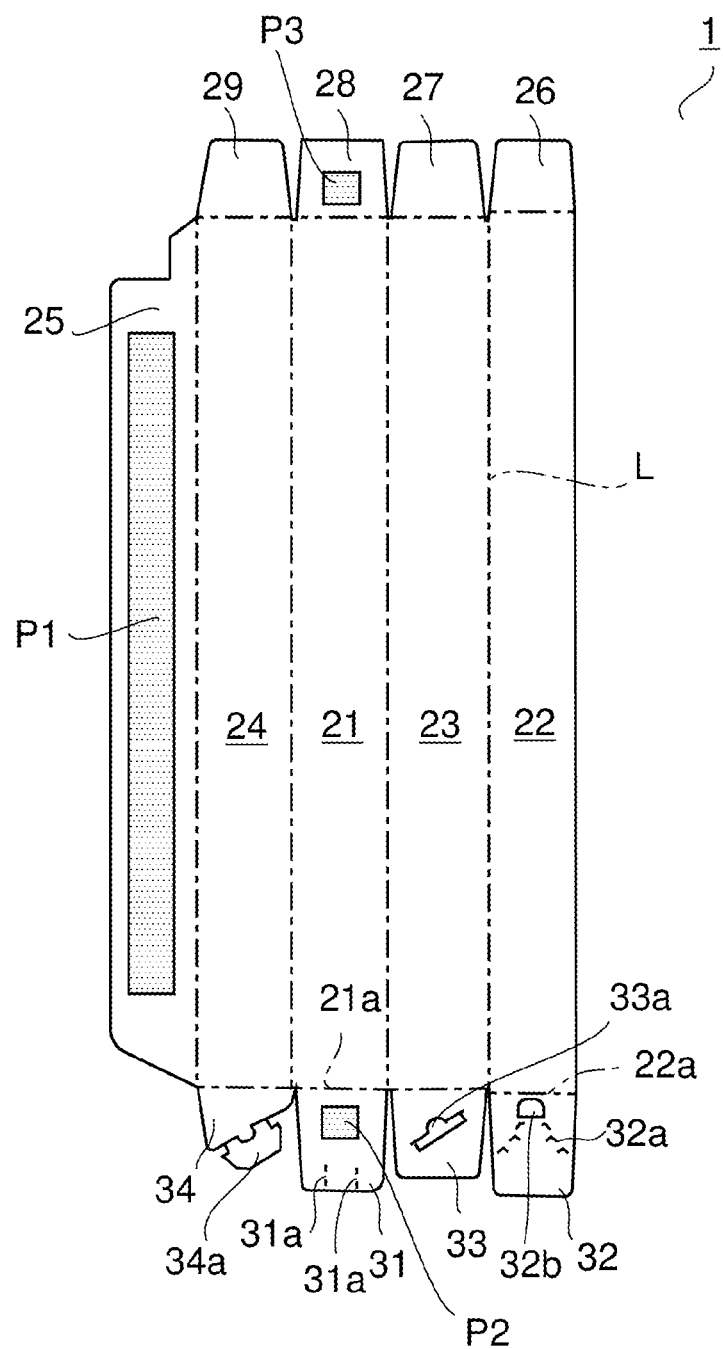
FIG. 3 is a developed view of the packaging box according to the first embodiment of the present disclosure.

FIG. 3 shows a developed view of the packaging box 1. In the packaging box 1, a gluing margin piece 25, the second circumferential surface plate 24, the first circumferential surface plate 21, the second circumferential surface plate 23, and the first circumferential surface plate 22 are connected in order via crease lines L. The first circumferential surface plates 21 and 22 and the second circumferential surface plate 23 and 24 are each formed in a rectangular shape.

The first cover plate 31 is connected to one end of the first circumferential surface plate 21 in a longitudinal direction thereof via one of the crease lines L (the first end edge 21a), and a bottom surface plate 28 is connected to the other end of the first circumferential surface plate 21 in the longitudinal direction thereof via another one of the crease lines L. The second cover plate 32 is connected to one end of the first circumferential surface plate 22 in a longitudinal direction thereof via still another one of the crease lines L (the second end edge 22a), and a bottom surface plate 26 is connected to the other end of the first circumferential surface plate 22 in the longitudinal direction thereof via yet another one of the crease lines L.

The flap plate 33 is connected to one end of the second circumferential surface plate 23 in a longitudinal direction thereof via yet another one of the crease lines L, and a flap plate 27 is connected to the other end of the second circumferential surface plate 23 in the longitudinal direction thereof via yet another one of the crease lines L. The flap plate 34 is connected to one end of the second circumferential surface plate 24 in a longitudinal direction thereof via yet another one of the crease lines L, and a flap plate 29 is connected to the other end of the second circumferential surface plate 24 in the longitudinal direction thereof via yet another one of the crease lines L.

The second cover plate 32 has the above-described breaking line 32a and through hole 32b formed therein. The first cover plate 31 has the above-described incision lines 31a formed therein. The breaking line 32a and the incision lines 31a are formed in a shape of perforations as a discontinuous row of a plurality of incisions penetrating the packaging box 1.

The packaging box 1 is fabricated in the following manner. First, crest folding is performed on the crease lines L, and an outer surface of the gluing margin piece 25 is adhered to an inner surface of the first circumferential surface plate 22 via an adhesion region P1. Thus, the body 20 is formed to have a cylindrical shape. Then, an outer surface of the first cover plate 31 is adhered to an inner surface of the second cover plate 32 via the adhesion region P2. Thus, the packaging box 1 is closed at one end part thereof in its longitudinal direction.

Then, for example, a toner cartridge (not shown) is inserted into the packaging box 1, and an outer surface of the bottom surface plate 28 is adhered to an inner surface of the bottom surface plate 26 via an adhesion region P3. Thus, the packaging box 1 is closed at the other end part thereof in its longitudinal direction, so that fabrication of the packaging box 1 and an operation of packaging the toner cartridge are completed.

Figure 4:
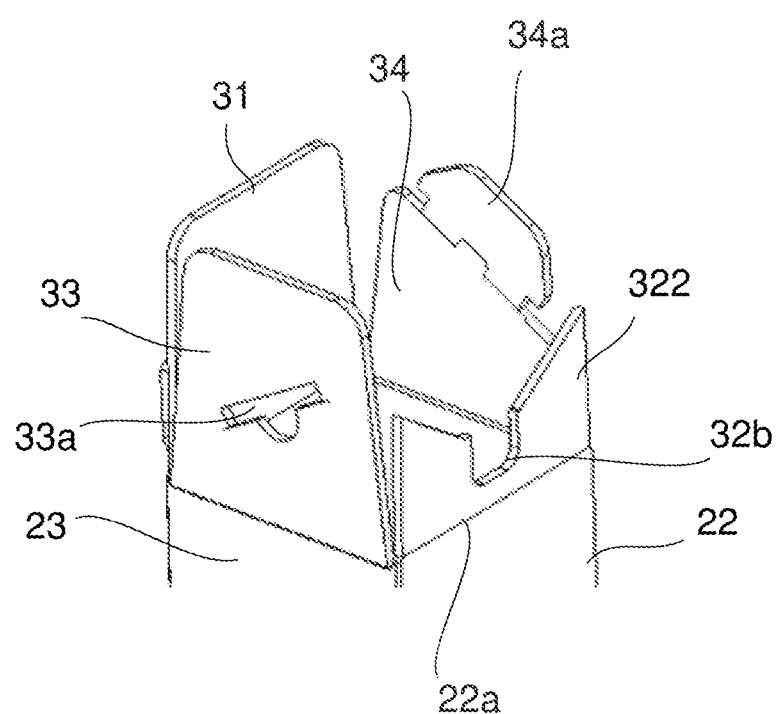
FIG. 4 is a perspective view showing, on an enlarged scale, the one end part of the packaging box according to the first embodiment of the present disclosure in the longitudinal direction thereof.
Figure 5:
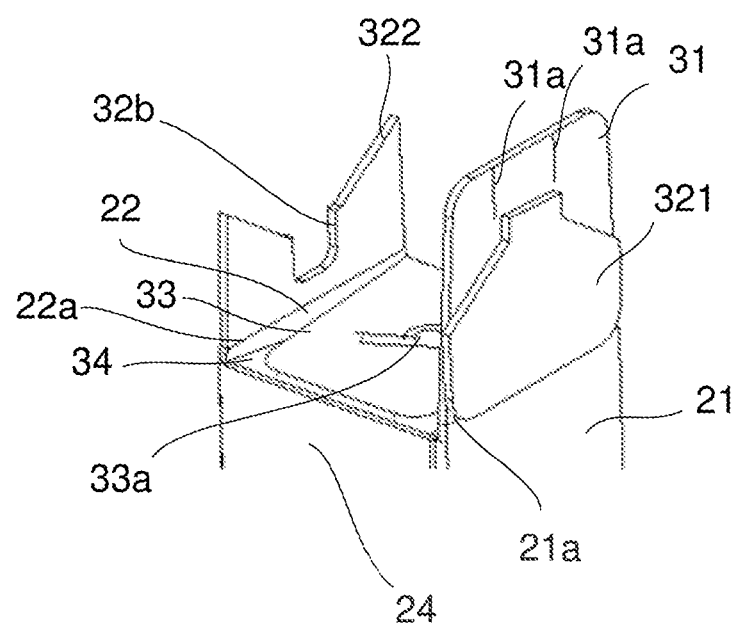
FIG. 5 is a perspective view showing, on an enlarged scale, the one end part of the packaging box according to the first embodiment of the present disclosure in the longitudinal direction thereof.

FIG. 4 and FIG. 5 are perspective views of the packaging box 1 in an unsealed state. At a time of unsealing, a forefinger is pushed into the through hole 32b to break the first cover plate 31 along the incision lines 31a so as to push and tear the push-in piece 31b. Then, the first cover plate 31 and the second cover plate 32 overlapping each other are held with a thumb and the forefinger and lifted. Thus, the second cover plate 32 is broken along the breaking line 32a to be split into an adhesive piece 321 and a peeling piece 322. The adhesive piece 321 of the second cover plate 32 resulting from the splitting remains in a state of being adhered to the first cover plate 31 via the adhesion region P2. Furthermore, the peeling piece 322 of the second cover plate 32 resulting from the splitting remains in a state of being connected at one side thereof to the second end edge 22a and peeled off from the adhesive piece 321 along the breaking line 32a formed to be opposed to the one side. That is, the peeling piece 322 is provided outside the adhesion region P2. Accordingly, it is possible to provide the packaging box 1 enabling an improvement in convenience at a time of unsealing while reducing the number of trash pieces.

The peeling piece 322 of the second cover plate 32, the first cover plate 31, and the flap plates 33 and 34 are folded back outward, and thus one end of the packaging box 1 in the longitudinal direction thereof is opened. Thus, it is possible to easily take the contents out of the packaging box 1.

Furthermore, after the packaging box 1 has been unsealed, the insertion piece 34a is inserted into the insertion hole 33a so that the flap plate 33 is engaged with the flap plate 34, and thus the packaging box 1 can be closed.

Second Embodiment

Figure 6:
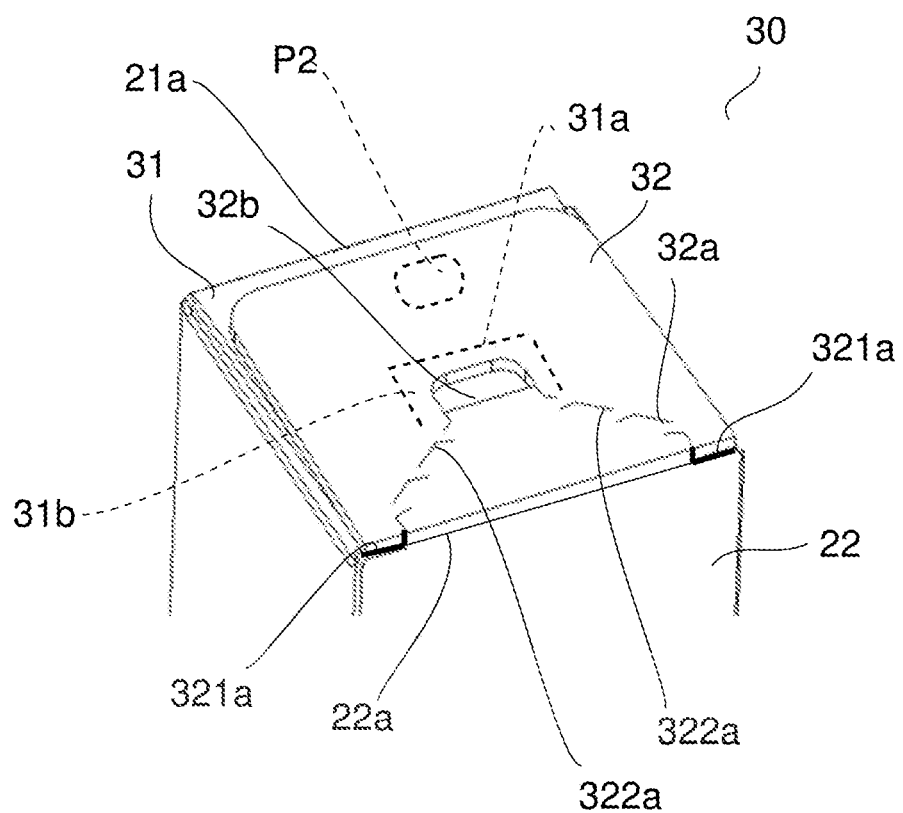
FIG. 6 is a perspective view showing, on an enlarged scale, one end part of a packaging box according to a second embodiment of the present disclosure in a longitudinal direction thereof.
Figure 7:
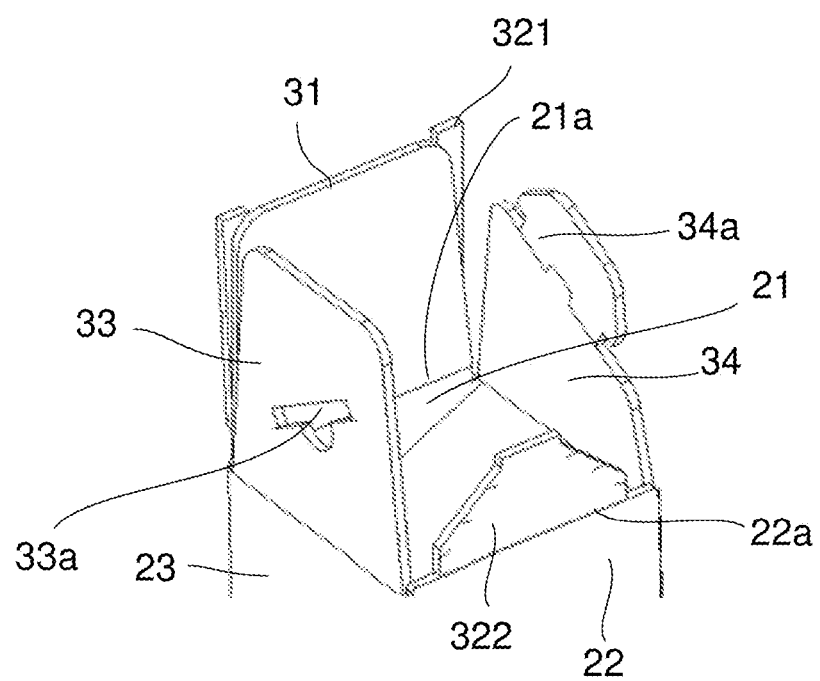
FIG. 7 is a perspective view showing, on an enlarged scale, the one end part of the packaging box according to the second embodiment of the present disclosure in the longitudinal direction thereof.

A description is given next of a second embodiment. FIG. 6 and FIG. 7 are perspective views showing, on an enlarged scale, one end part of a packaging box 1 of a second embodiment in a longitudinal direction thereof. FIG. 6 shows a state thereof before unsealing, and FIG. 7 shows an unsealed state thereof. For the sake of convenience of explanation, parts identical to those in the foregoing first embodiment shown in FIG. 1 to FIG. 5 are denoted by identical reference signs. This embodiment is different in shape of a breaking line 32a.

The breaking line 32a is formed in a V shape convex toward a first end edge 21a. Cutting lines 321a are formed at both ends of a second end edge 22a, respectively. The cutting lines 321a are formed of incisions penetrating a corrugated cardboard plate. The cutting lines 321a may be in a shape of perforations formed as a discontinuous row of incisions.

The breaking line 32a includes a pair of inclined parts 322a extending respectively from inner ends of the culling lines 321a toward the first end edge 21a. An incision line 31a is formed in a U shape as viewed in plan and encloses a region opposed to a through hole 32b. Thus, when the region opposed to the through hole 32b is pushed down, a first cover plate 31 is broken on the incision line 31a to form a push-in piece 31b.

At a time of unsealing, a forefinger is pushed into the through hole 32b, and the first cover plate 31 and a second cover plate 32 overlapping each other are held with a thumb and the forefinger and lifted. Thus, breaking occurs on the breaking line 32a along the inclined parts 322a up to the cutting lines 321a. This achieves splitting into an adhesive piece 321 and a peeling piece 322. In this case, the peeling piece 322 is formed in a substantially triangular shape.

The embodiments disclosed herein are to be construed in all respects as illustrative and not limiting. The scope of the present disclosure is indicated by the appended claims rather than by the foregoing descriptions of the embodiments, and all changes that come within the meaning and range of equivalency of the claims are intended to be embraced therein.

For example, while the foregoing embodiments describe the packaging box 1 in which the pair of first circumferential surface plates 21 and 22 are opposed to each other in the up-down direction, the pair of first circumferential surface plates 21 and 22 may be disposed so as to be opposed to each other in the front-rear direction or a left-right direction. Furthermore, the breaking line 32a may be in a shape of a straight line, a wiggly line, or the like other than the V shape.

Furthermore, any configuration obtained by combining configurations of the foregoing embodiments and modification examples is also embraced in the technical scope of the present disclosure.

What is claimed is:

1. A packaging box, comprising:
    a body having a rectangular tube shape; and
    a cover for closing an opening of the body on one side thereof,
    wherein
    the body is composed of:
        a pair of first circumferential surface plates opposed to each other; and
        a pair of second circumferential surface plates opposed to each other orthogonally to the pair of first circumferential surface plates,
    the cover includes:
        a first cover plate that is connected to a first end edge of one of the pair of first circumferential surface plates on a side near the opening and closes the opening; and
        a second cover plate that is connected to a second end edge on the opening side of the other of the pair of first circumferential surface plates and is adhered to an outer surface of the first cover plate, and
    the second cover plate is split into:
        an adhesive piece that is adhered to the first cover plate; and
        a peeling piece that has one side connected to the second end edge and is peeled off from the adhesive piece along a breaking line,
    wherein
    the second cover plate has a through hole that is disposed adjacently to a center of the breaking line in an extending direction thereof and into which a finger is insertable.

2. The packaging box according to claim 1, wherein the first cover plate includes, in a region thereof opposed to the through hole, a push-in piece that can be separately pushed in along an incision line.

3. A packaging box, comprising:
    a body having a rectangular tube shape; and
    a cover for closing an opening of the body on one side thereof,
    wherein
    the body is composed of:
        a pair of first circumferential surface plates opposed to each other; and
        a pair of second circumferential surface plates opposed to each other orthogonally to the pair of first circumferential surface plates,
    the cover includes:
        a first cover plate that is connected to a first end edge of one of the pair of first circumferential surface plates on a side near the opening and closes the opening; and
        a second cover plate that is connected to a second end edge on the opening side of the other of the pair of first circumferential surface plates and is adhered to an outer surface of the first cover plate, and
    the second cover plate is split into:
        an adhesive piece that is adhered to the first cover plate; and
        a peeling piece that has one side connected to the second end edge and is peeled off from the adhesive piece along a breaking line,
    wherein
    the breaking line is formed in a V shape convex toward the second end edge.

4. A packaging box, comprising:
    a body having a rectangular tube shape; and
    a cover for closing an opening of the body on one side thereof,
    wherein
    the body is composed of:
        a pair of first circumferential surface plates opposed to each other; and
        a pair of second circumferential surface plates opposed to each other orthogonally to the pair of first circumferential surface plates,
    the cover includes:
        a first cover plate that is connected to a first end edge of one of the pair of first circumferential surface plates on a side near the opening and closes the opening; and
        a second cover plate that is connected to a second end edge on the opening side of the other of the pair of first circumferential surface plates and is adhered to an outer surface of the first cover plate, and
    the second cover plate is split into:
        an adhesive piece that is adhered to the first cover plate; and
        a peeling piece that has one side connected to the second end edge and is peeled off from the adhesive piece along a breaking line, wherein
the breaking line is formed in a V shape convex toward the first end edge.

5. The packaging box according to claim 4, wherein
a pair of cutting lines is formed at both ends of the second end edge, and
the breaking line includes a pair of inclined parts extending respectively from inner ends of the pair of cutting lines toward the first end edge.

* * * * *